United States Patent [19]

Breitweiser, Jr.

[11] Patent Number: 5,557,055

[45] Date of Patent: Sep. 17, 1996

[54] MUSICAL KEYBOARD HAVING AN ELECTRONICALLY CONTROLLED DISPLAY AND A METHOD OF KEYBOARD DISPLAY

[75] Inventor: Frederick W. Breitweiser, Jr., East Rutherford, N.J.

[73] Assignee: Breitweiser Music Technology Inc., Wall Township, N.J.

[21] Appl. No.: 245,218

[22] Filed: May 17, 1994

[51] Int. Cl.$^6$ ................................. G09B 15/08
[52] U.S. Cl. .......................... 84/478; 84/485 R
[58] Field of Search .................. 84/478, 485 R, 84/470 R, 477 R

[56] References Cited

U.S. PATENT DOCUMENTS

| | | | |
|---|---|---|---|
| 3,837,256 | 9/1974 | Gullickson | 84/478 |
| 3,978,757 | 9/1976 | Johnson et al. | 84/485 |
| 4,061,072 | 12/1977 | Castillo | 84/478 |
| 4,314,499 | 2/1982 | Olsen | 84/485 |
| 4,422,365 | 12/1983 | Iwaki | 84/478 |
| 4,651,612 | 3/1987 | Matsumoto | 84/478 |
| 4,694,723 | 9/1987 | Shinohara et al. | 84/478 |
| 4,730,533 | 3/1988 | Schoerkmayr | 84/478 |
| 5,107,743 | 4/1992 | Decker | 84/478 |
| 5,214,231 | 5/1993 | Ernst et al. | 84/478 |
| 5,392,682 | 2/1995 | Mc-Cartney-Hoy | 84/470 R |

FOREIGN PATENT DOCUMENTS

| | | | |
|---|---|---|---|
| 1243094 | 9/1989 | Japan | 84/464 A |
| 1245294 | 9/1989 | Japan | 84/464 A |

*Primary Examiner*—P. J. Satnzione
*Attorney, Agent, or Firm*—Jeremiah G. Murray

[57] ABSTRACT

A musical keyboard instrument comprising an electronic keyboard and a control panel. The keyboard is composed of black and white keys arranged in a conventional pattern. A keyboard display made up of LED displays and red-green illuminators inform a user of the proper finger and hand positions to be used on the keyboard. To view the keyboard display when it is activated, the user simply looks directly at the keys. Each red-green illuminator mounts on the interior of a housing such that a pair of red and green lights extend into the hollow interior of one of the keys. Normally, the keys appear to a player as conventional black and white keys. However, the upper surfaces of the keys are made partially transparent and light dispersive such that its apparent color to a player will change when properly back lit by the red-green illuminators. The illuminators and the LED displays are controlled when a user makes selections from a bank of pushbutton switches. The illuminators and LED displays may also be controlled by input signals provided by an external computer system.

19 Claims, 5 Drawing Sheets

MUSICAL KEYBOARD HAVING AN ELECTRONICALLY CONTROLLED DISPLAY AND A METHOD OF KEYBOARD DISPLAY

BACKGROUND OF THE INVENTION

1. Field of the Invention

This invention relates to musical instruments. More specifically, the invention relates to a musical instrument having a keyboard with a displays system, and to a method for visually exhibiting musical and playing information under user control.

2. Description of the Prior Art

To facilitate the teaching of musical instruments, a variety of training aids have been developed. In the recent past, electronic audiovisual devices have been produced for use with the teaching of playing stringed instruments, such as guitars, and keyboard instruments, such as pianos and organs. Some of these electronic teaching aids permit a student to play an instrument while viewing an electronically controlled display of fingering diagrams and listening to prerecorded instructions, notes, cords, etc. One class of such prior art teaching aids employs illumination elements, such as lights, that are arrayed on or near the musical instrument being played. These illumination elements, when energized by a control circuit, are intended to visually indicate to the student the proper finger positions. In addition, an audio output simultaneously provides a musical accompaniment, teacher instructions, and so on.

U.S. Pat. No. 3,837,256, issued to Cecil F. Gullickson on Sep. 24, 1974, discloses a prior art musical instrument instruction aid which provides sight and sound instructions. The Gullickson patent discloses a keyboard type musical instrument having an illumination means composed of lights that are embedded in the keys. The lights connect to a control circuit which illuminates the lights in accordance with coded information prerecorded on a magnetic tape. The control circuit selectively and sequentially illuminates the lights in accordance with the prerecorded coded information to visually indicate to the user the particular keys to be struck. An audio means also responds to the magnetic tape which, in addition to the coded information, contains audio signals for playing melodies, beats, voice instructions, and the like as the illumination means is being energized.

Other examples of this class of musical instruments appear in the following U.S. patents: U.S. Pat. No. 4,694,723 issued to Isao Shinohara et al. on Sep. 22, 1987; U.S. Pat. No. 4,651,612, issued to Naoaki Matsumoto on Mar. 24, 1987; and U.S. Pat. No. 4,422,365, issued to Shunichi Iwaki on Dec. 27, 1983. These patents illustrate various types of keyboard display systems designed to help the beginning player follow the display with greater ease. Many of the prior art instructional keyboards of this class also provide display, playback and accompaniment systems for use by more experienced musicians when they are trying to master difficult pieces or special playing techniques. Further, the instructional display systems of some musical keyboards of this class can be effectively employed by musicians as a aid in composing and/or arranging music.

Although these prior art systems have served many purposes, they have not proved entirely satisfactory for a number of reasons. The display and control systems of many prior art systems are not easily used by a person who has little or no musical experience. For example, most of the prior art systems fail to display finger positions in a clear and unambiguous manner. Also, the illumination means in many of the prior art systems make it difficult for the user to quickly find the keys to be struck, thereby impeding the learning process. Further prior art systems do not provide sufficient user control of the system so that the instrument may be easily accommodated to a particular skill level or specialized use such as music composition and arranging.

Consequently, because of these and other deficiencies, those skilled in these arts recognize the need for improved musical keyboard display systems and display methods that mitigate the many problems resulting from these deficiencies. The present invention fulfills this need.

SUMMARY

The general purpose of this invention is to provide a musical instrument system and method that can provide visual and audio information such that most musicians ranging from a beginning student to an accomplished artist would find it beneficial to use.

Broadly, the present invention is directed to a musical instrument system composed of a musical keyboard having a plurality of keys. A keyboard display mounts on the keyboard adjacent the keys for selectively identifying which of the keys are to be played by a player and which of the player's fingers are to be used for playing the keys. A control circuit connects to the keyboard display for receiving input signals and for controlling the keyboard display in response to the input signals.

More specifically, the invention is directed to a musical instrument system having a musical keyboard composed of a set of partially transparent playing keys. Plural indicia devices are each embedded in the upper surface of a different one of the playing keys for indicating which of the player's fingers are to be used for playing the playing key in which it is embedded. Plural two-color illumination devices mount adjacent to and below the lower surface of a different one of the playing keys for directing different colored light through the adjacent key for indicating which of the player's hands are to be used for playing the adjacent one of the playing keys. A control circuit connects to the indicia devices and the two-color illuminators for receiving input signals and for selectively energizing the indicia devices and the two-color illuminators in response to the input signals.

Another aspect of the invention is directed to a method of operating a musical keyboard instrument having a plurality of keys by causing the appearance of the keys to change to indicate to a player the hand to be used for playing the keys. Indicia are selectively displayed on the keys to indicate to a player the fingers of the hands to be used for playing the keys. The appearance of the keys is selectively changed and the indicia on the keys are selectively changed in accordance with prerecorded patterns. The technique of causing the appearance of the keys to change includes selectively illuminating the keys with two different colors to indicate which one of the player's hands is to be used for playing the keys. The process of displaying the indicia on the keys includes selectively displaying on the surface of the keys a finger identifying symbol from a set of possible symbols.

It is therefore an object of this invention to provide a musical keyboard instrument with a keyboard display for helping a player to learn how to play the instrument.

Another object of the invention is to provide a musical keyboard instrument with a player controlled keyboard display and input circuit for helping a player to learn how to play particular musical pieces and playing techniques.

A further object of the present invention is to provide a method of operating a musical keyboard instrument with a player controlled keyboard display, input circuit and a note display for helping a player to learn basic to advanced musical theory.

Still a further object of the invention is to provide a musical keyboard instrument with a keyboard display and a player controlled data input system for use by a musician when composing and/or arranging music.

The exact nature of this invention as well as other objects and advantages thereof will be readily apparent from consideration of the following specification relating to the annexed drawings.

DETAILED DESCRIPTION OF THE PREFERRED EMBODIMENT

Referring now to the drawings, there is shown in FIGS. 1–5 an electronic musical keyboard assembly 20 comprising electronic keyboard 22 and control panel 24 mounted on housing 23. Although the drawings illustratively depict the preferred embodiment as an electronic musical keyboard, it is to be understood that the invention is applicable to other musical instruments having keyboards, such as conventional pianos and organs, electronic pianos and organs, accordions, keyboard synthesizers and the like.

Figure 1:
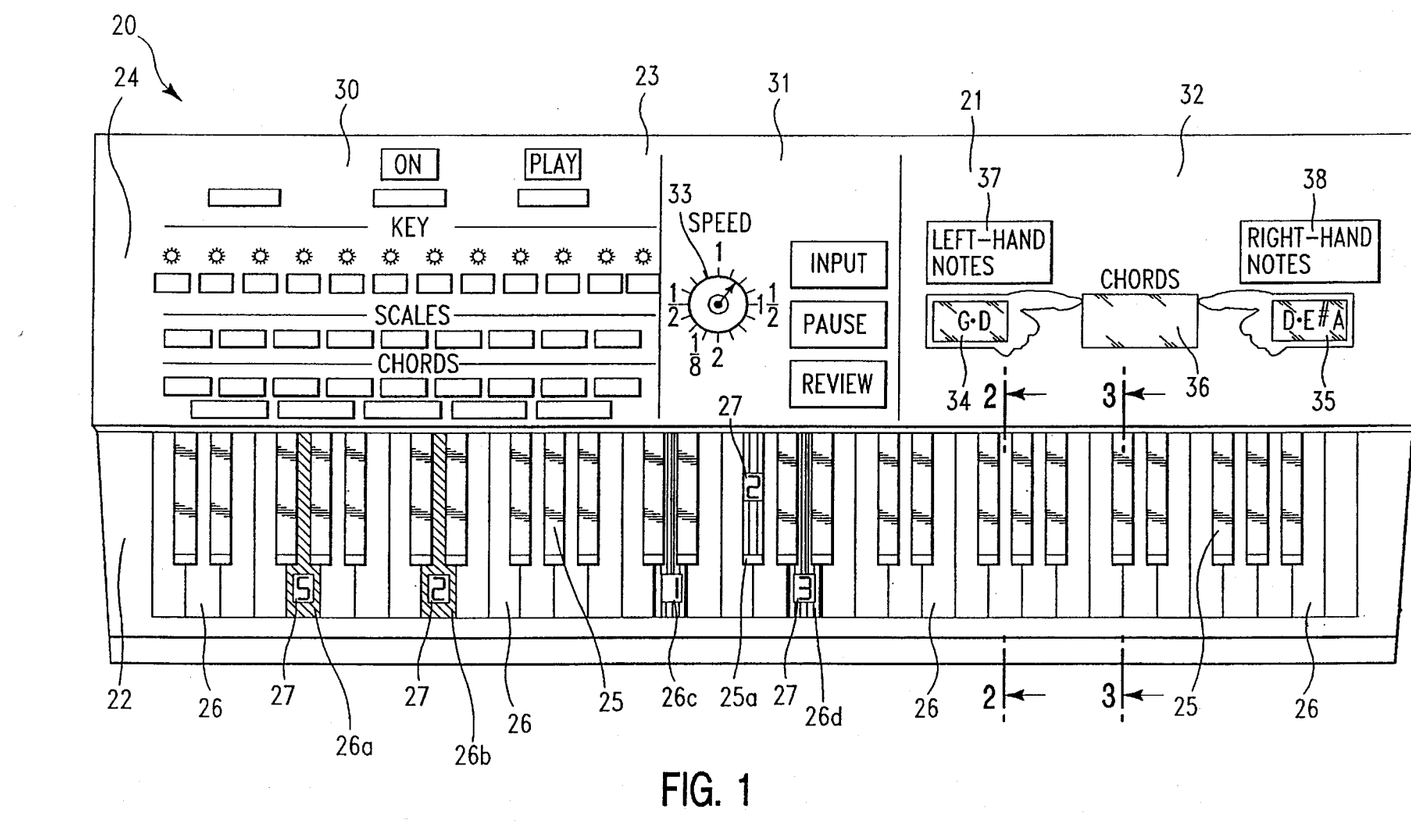
FIG. 1 is a simplified top view illustrating a preferred embodiment of the electronic musical keyboard assembly of the present invention.
Figure 2:
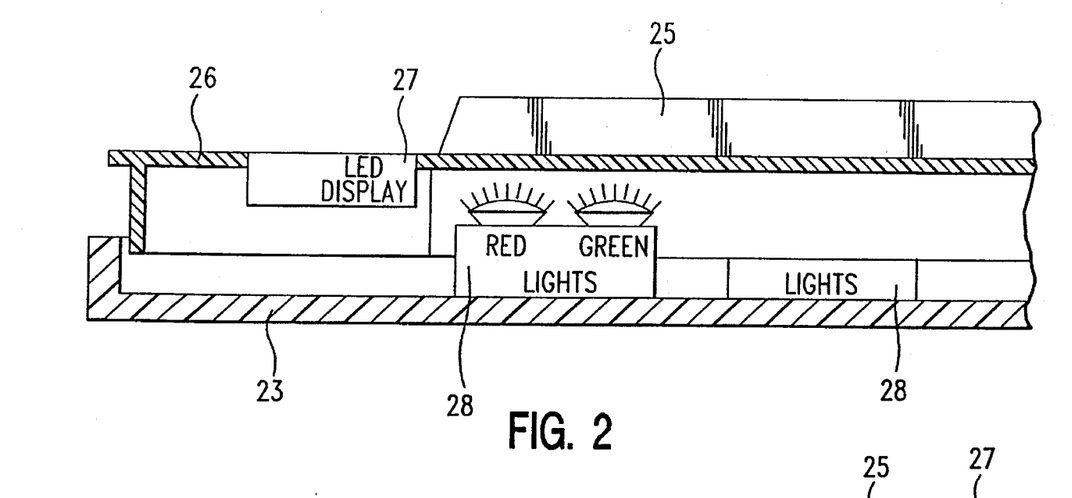
FIG. 2 is a partial cross section in elevation of a key assembly taken on the line 2—2 of FIG. 1 and looking in the direction of the arrows.
Figure 3:
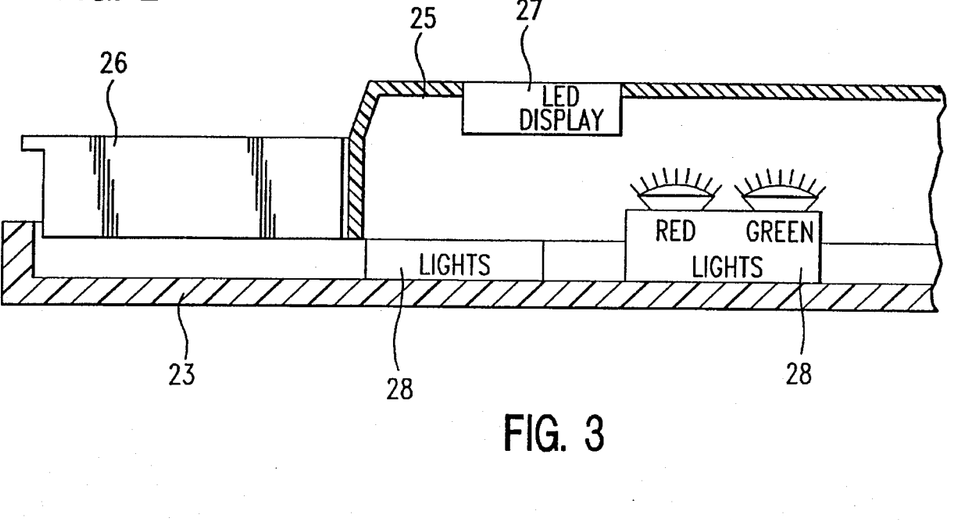
FIG. 3 is a partial cross section in elevation of a key assembly taken on the line 3—3 of FIG. 1 and looking in the direction of the arrows.

Keyboard 22 is composed of black keys 25 and white keys 26 arranged in a conventional pattern. In the present example, keys 25 and 26 make up five octaves with each octave having five black keys 25 and seven white keys 26. Keyboard 22 also includes a keyboard display that, when activated, informs a user of the proper finger and hand positions to be used on keyboard 22. To view the keyboard display when it is activated, the user simply looks directly at keys 25 and 26. More specifically, the keyboard display includes a fingering display having a plurality of numeric displays 27, each of which is embedded in the upper surface of one of keys 25 and 26. Numeric displays 27 are preferably formed from conventional LED devices that, when energized, display digits from one to five which represent the player's fingers.

The keyboard display further includes a hand-identifying display composed of a set of red-green illuminators 28 each having a red and a green light. Each red-green illuminators 28 mounts on the interior of housing 23 such that its pair of red and green lights extend into the hollow interior of one of keys 25 and 26. It is contemplated that keys 25 and 26 normally appear as conventional black and white keys. However, the upper surfaces of keys 25 and 26 are made partially transparent and light dispersive such that its apparent color to a player will change when properly back lit by the red-green illuminators 28. As described in detail below, the red-green illuminators 28 are selectively energized to inform the player which hand should be used to strike the illuminated key, specifically, green representing the left hand and red representing the right hand in the present embodiment.

Numeric displays 27 are preferably constructed so as to be unseen by the player when they are not energized and to be clearly visible when energized. It is contemplated that the exposed faces of numeric displays 27 be formed of a material having a color, i.e. black or white, so that they blend in with the color of the key in which they are embedded. When energized during keyboard display operation, however, numeric displays 27 emit light and display a numeric digit from one to five. A student player, when viewing illuminated keys 25 and 26, and energized numeric displays 27, is informed, therefore, as to which particular finger of which hand should be used to properly strike the illuminated keys 25 and 26. By directly viewing keys 25 and 26, the student player is shown the precise finger and hand configurations needed to play selected music.

For example, FIG. 1 shows normally white keys 26a and 26b illuminated to appear green while their numeric displays 27 show the digits "5" and "2," respectively. FIG. 1 also shows normally white keys 26c and 26d, and normally black key 25a illuminated to appear red while having their displays 27 show the digits "1," "3" and "2," respectively. In the drawings, diagonal cross hatching indicates the color green and vertical cross hatching indicates the color red. During instructional operation, this state of the keyboard display instructs the student to strike keys 26a and 26b with the little finger and index finger of the left hand, respectively, while striking keys 26c, 25a and 26d with the thumb, index finger and middle finger of the right hand, respectively.

Figure 4:
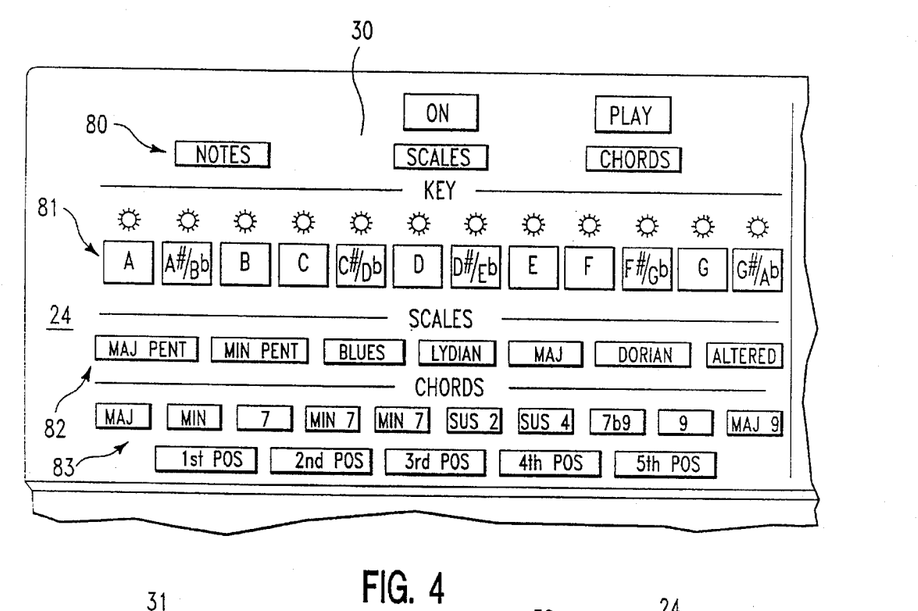
FIG. 4 is a simplified top view illustrating details of a portion of the apparatus shown in FIG. 1.
Figure 5:
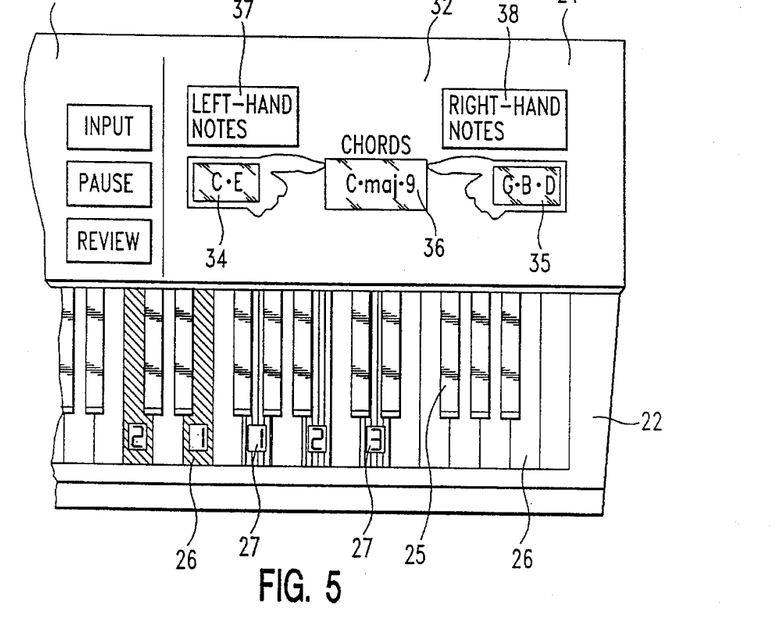
FIG. 5 is a simplified top view illustrating another portion of the apparatus shown in FIG. 1.

A player selects specific music and operates the keyboard display via control panel 24. With reference to FIGS. 1, 4 and 5, control panel 24 is composed of tone select section 30, input section 31 and notes display section 32. Tone select section 30 comprises banks of conventional pushbuttons and lights which permit the player to manually select specific tones in the form of notes, scales or chords. Selection of specific pushbuttons in tone select section 30 activates the keyboard display by illuminating specific keys 25 and 26 and energizing numeric displays 27.

Input section 31 comprises SPEED control dial 33 and three pushbuttons labeled INPUT, PAUSE and REVIEW. The three pushbuttons of input section 31 enable the player to control the input of keyboard control signals and operate the keyboard display from an external source such as microcomputer 40 in a manner described below in detail.

Notes display section 32 includes left-hand notes display 34, right-hand notes display 35 and chords display 36. Left-hand notes display 34 and right-hand notes display 35 display the conventional letter designations for the notes corresponding to the illuminated keys 25 and 26. For the example shown in FIG. 1, display 34 shows the notes "G" and "D," which identifies the left-hand notes associated with the green illuminated keys 26a and 26b. Likewise, display 35 shows the notes "D," "E#" and "A," which identifies the right-hand notes associated with the red illuminated keys 26c, 25a and 26d. If either the left- or right-hand notes or both form a chord, chords display 36 will identify the name of the chord. Indicator lights 37 and 38 are selectively illuminated to identify which set of notes in displays 34 and 35, if any, form the chord identified in display 36.

For the example shown in FIG. 5, notes display section 32 displays notes "C" and "E" in display 34, notes "G," "B" and "D" in display 35 and the corresponding chord symbol "C maj 9" in the chords display 36. In this case, the C major 9th chord is formed by both the left and right hands. As such, both indicator lights 37 and 38 will be illuminated. FIG. 5 also shows the keyboard display activated such that keys 25 and 26 in the 4th position are illuminated. Specifically, the "C" and "E" keys are illuminated green and display the digits "1" and "2," while the "G," "B" and "D" keys are illuminated red and display the digits "1," "2" and "3."

In summary, therefore, the green and red illuminated keys 25 and 26 and the digits displayed thereon identify which fingers of the left and right hands, respectively, should be used to play the notes displayed in displays 34 and 35. Chords display 36 identifies the name of the chord, if any, formed by the illuminated keys 25 and 26. Indicator lights 37 and 38 indicate which notes are forming the chord that is displayed in chord display 36. These displays are activated in response to selections made by the user at tone select section 30 or as a function of input data received from the external source.

Figure 6:
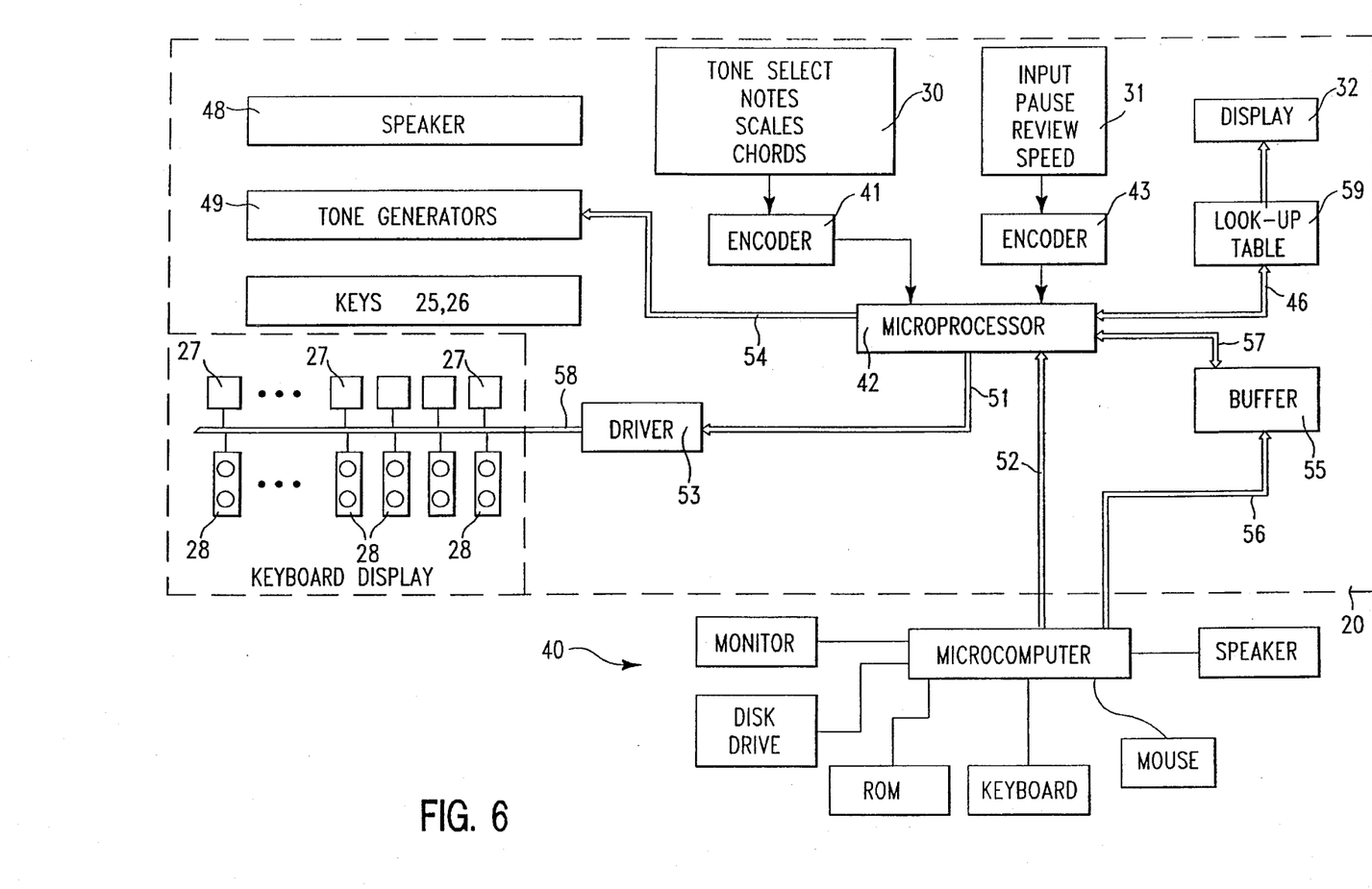
FIG. 6 is a schematic of a functional block diagram showing the major components of a control system and a musical keyboard made in accordance with the present invention.

FIG. 6 contains a functional block diagram showing the major components of keyboard assembly 20 connected to an input device illustratively depicted as conventional multimedia microcomputer 40. FIG. 6 schematically illustrates keys 25 and 26 as being connected to conventional tone generators 49, which provide audio signals to speaker 48. The pushbuttons of tone select section 30, details of which are illustratively shown in FIG. 4, connect to microprocessor system 42 via encoder 41. INPUT, PAUSE and REVIEW pushbuttons and SPEED control dial 33 of input section 31 connect to microprocessor system 42 via encoder 43. Output line 51 connects microprocessor system 42 to the keyboard display via driver circuit 53, which drives numeric displays 27 and illuminators 28 via bus 58. Output line 54 connects microprocessor system 42 to tone generators 49. Line 46 connects microprocessor system 42 to chord look-up memory 59 which in turn connects to display 32.

Illustratively, multimedia microcomputer 40 is composed of conventional computer peripherals including user input devices, such as a keyboard and a mouse, data storage and input devices, such as a disk drive and a CD-ROM device, and output devices, such as a video monitor and one or more speakers. Microcomputer 40 communicates with microprocessor system 42 via two-way communication line 52 and provides control signals to buffer 55 via data communication line 56. Microprocessor system 42 reads the keyboard control signals from buffer 55 via line 57 at the speed determined by SPEED control dial 33.

Figure 7:
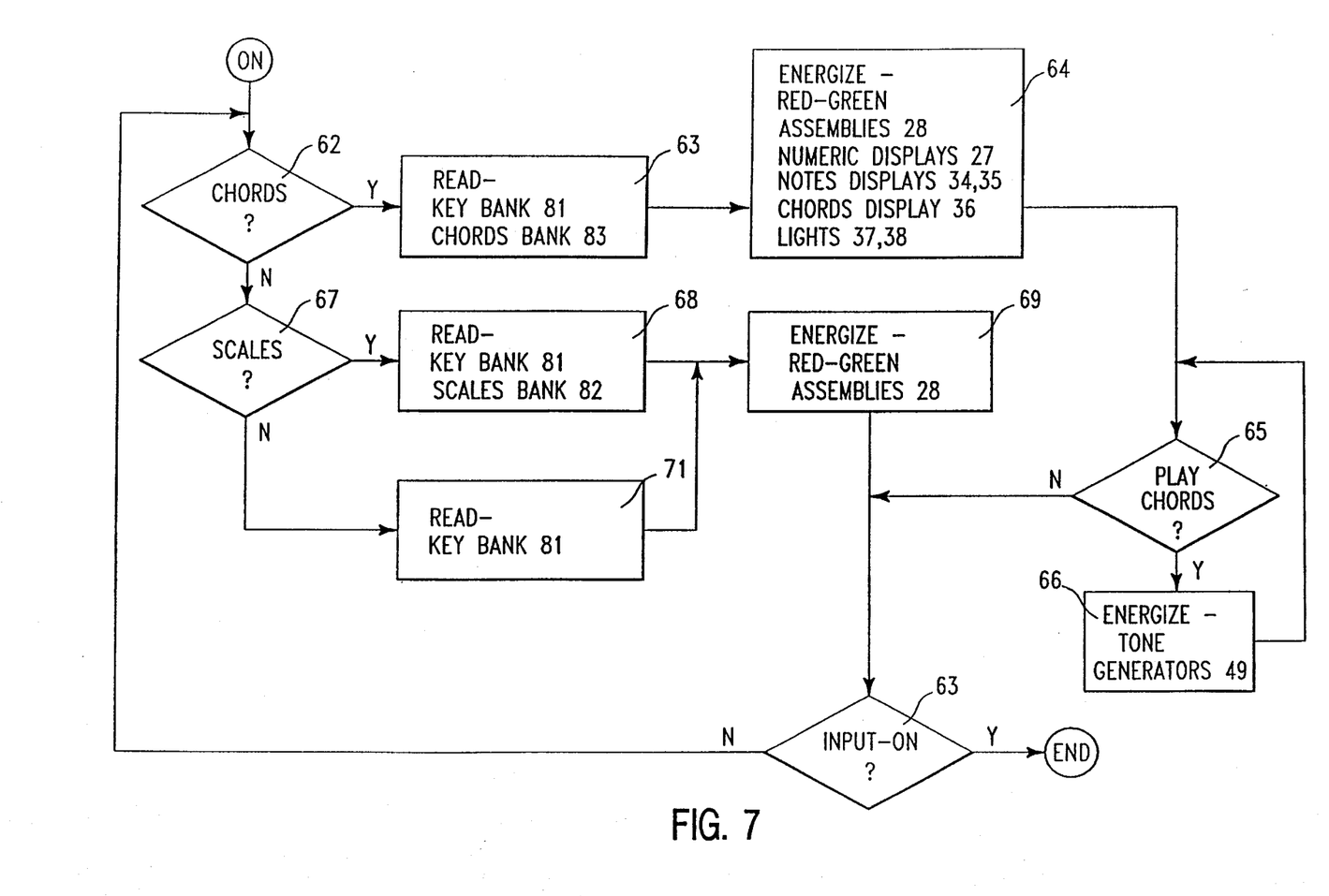
FIG. 7 is a high-level functional block diagram illustrating the operation of the system shown in FIG. 6.

Microprocessor system 42 responds to user selections made from the banks of pushbuttons mounted in tone select section 30 in accordance with the steps shown in the flow diagram of FIG. 7. The ON pushbutton in bank 80 of tone select section 30 toggles between its on and off states. Also, the ON pushbutton and the INPUT pushbutton are ganged such that selection of one causes the other to be turned off. Consequently, when the user selects the ON pushbutton in tone select section 30, the INPUT pushbutton in input section 31, if already on, is turned off and tone select section 30 is activated. After selecting the ON pushbutton, the user makes a tone selection by selecting one of the pushbuttons labeled NOTES, SCALES and CHORDS in bank 80. These pushbuttons (NOTES, SCALES and CHORDS) are also ganged such that selection of one deselects the others.

In accordance with step 62 of FIG. 7, if microprocessor system 42 finds that the CHORDS pushbutton in bank 80 is selected, it performs step 63 by reading the selected pushbuttons in chords bank 83 and key bank 81. It is noted that the pushbuttons in key bank 81 are also ganged such that only one pushbutton may be selected at a time. Additionally, with respect to pushbuttons in the chords bank 83, the pushbuttons in the upper row are ganged such that it is possible to select only one pushbutton in that row. The pushbuttons in the upper row of bank 83 permit the player to select from a menu of popular chords which appear as labels on the pushbuttons. The pushbuttons in the lower row of bank 83 are also ganged such that it is possible to select only one pushbutton in that row. This lower row of pushbuttons allow the player to designate the keyboard position for the chord selected in the upper row. Since keyboard 22 is composed of five octaves, five ganged pushbuttons are placed in this lower row to enable selection of a chord position. These five pushbuttons are labeled "1st POS–5th POS."

After reading the state of the pushbuttons in key bank 81 and chords bank 83, microprocessor system 42 performs step 64 by energizing the appropriate displays. More specifically, microprocessor system 42 in step 64 sends keyboard display signals on line 51 to driver circuit 53 which drives the appropriate red-green illuminators 28 and numeric displays 27. Also in step 64, microprocessor system 42 transmits pushbutton data to look-up table memory 59, which has stored therein data relating specific notes and chords. In response, look-up table memory 59 transmits display signals to notes display section 32.

The example shown in FIG. 5 depicts the situation where a player has activated tone select section 30 and selected the C major 9th chord at the 4th position. Specifically, the player has selected the ON pushbutton in bank 80, the "C" pushbutton in key bank 81 and the "MAJ 9" and "4th POS" pushbuttons in chords bank 83. It is noted that lights are placed directly above the pushbuttons in key bank 81 to show the player which pushbutton in that bank is presently selected.

In response to these selections, microprocessor system 42 first finds that CHORDS pushbutton in bank 80 was selected, step 62, and then reads, in step 63, the note and chord pushbutton selections made in key bank 81 and chords bank 83. Microprocessor system 42 then outputs signals, step 64, to driver circuit 53 such that the keyboard keys 25 and 26 are properly illuminated and the corresponding numeric displays 27 are energized as shown in FIG. 5. Also in step 64, microprocessor system 42 provides look-up table memory 59 with data describing these pushbutton selections so that it can send appropriate display signals to notes display section 32. The output of look-up table memory 59 will cause the "C" and "E" notes to be displayed in display 34, the "G," "B" and "D" notes in display 35 and the corresponding chord symbol "C maj 9" in chord display 36. Indicator lights 37 and 38 will also be illuminated in step 64 by the output of look-up table memory 59.

If at this point the player wished to hear the keyboard assembly 20 generate the sound associated with the displayed chord, the player pushes the PLAY pushbutton in bank 80. Microprocessor system 42 detects this action in step 65 and responds in step 66 by transmitting appropriate tone generator signals on line 54 to energize tone generators 49. Speaker 48 produces the appropriate sound in response to tone generators 49.

If decision step 62 results in a NO, i.e., the CHORDS pushbutton in bank 80 was not selected, microprocessor system 42 proceeds to step 67 to determine whether the SCALES pushbutton in bank 80 was selected. If the result is YES, microprocessor system 42 performs step 68 by reading the selections made in key bank 81 and scales bank 82. Using the results of step 68, microprocessor system 42 performs step 69 by providing driver circuit 53 with appropriate signals to energize those red-green illuminators 28 associated with the scale selected in scales bank 83.

If steps 62 an 67 show that neither the CHORDS nor SCALES pushbuttons in bank 80 were selected (i.e., NOTES pushbutton is selected), microprocessor system 42 performs step 71 by reading which pushbutton the player selected in key bank 81. Using the results of step 71, microprocessor system 42 performs step 69 by providing driver circuit 53 with appropriate signals to energize those red-green illuminators 28 associated with the selected pushbutton in key bank 81. For example, if the NOTES pushbutton in bank 80 was selected and the "A" pushbutton in key bank 81 was selected, all of the keyboard keys for the "A" note would be illuminated with, for example, the red lights.

The player deactivates the tone select section 30 by pressing either the ON pushbutton in bank 80 or the INPUT pushbutton in input section 31. This action is detected in step 70 and causes the FIG. 7 process to end. If neither the ON pushbutton nor the INPUT pushbutton is pushed, the keyboard assembly 20 performs as a conventional electronic keyboard, i.e., the keyboard displays will not be operated. When the INPUT pushbutton of input section 31 is selected, microprocessor system 42 initiates communication with microcomputer 40 over lines 52 and 56.

With the INPUT pushbutton selected, microprocessor system 42 first reads the position of SPEED dial 33 and then sets the speed at which it will read the contents of buffer 55. As can be seen in FIG. 1, SPEED dial 33 increments in units of one-eight from a minimum of one-eighth (⅛) to a maximum of two (2). When SPEED dial 33 is set at one (1), microprocessor system 42 reads data from buffer 55 at the rate at which the corresponding music is normally played. Consequently, the numeric displays 27 and illuminators 28 will be activated at the normal playing rate of the musical piece being input by microcomputer 40. The player may slow this rate down in one-eighth steps to a minimum of one-eighth of the normal rate by adjusting SPEED dial 33 counterclockwise as seen in FIG.1. The display data rate may be increased in one-eighth steps to a maximum of twice the normal rate by turning SPEED dial 33 clockwise.

If neither the PAUSE nor REVIEW pushbuttons have been selected, microprocessor system 42 next sends a control signal to microcomputer 40, via line 52, telling it that buffer 55 is ready to accept keyboard control data over line 56. The keyboard control data that microcomputer 42 transmits to buffer 55 can originate as prerecorded data on a compact disk, a floppy disk or other storage medium. The data may also be manually input using the keyboard and/or the mouse. As the input data is being transmitted from microcomputer 40 to buffer 55, microprocessor system 42 reads the keyboard control data from buffer 55 at the rate set by SPEED dial 33. In response, microprocessor system 42 transmits display signals to look-up table memory 59 and driver circuit 53. Look-up table memory 59 sends appropriate display signals to notes display 32 while driver circuit 53 energizes red-green illuminators 28 and numeric displays 27.

The user may stop the flow of keyboard control data from buffer 55 by selecting the toggle-type PAUSE pushbutton in input section 31. In response, microprocessor system 42 stops reading the contents of buffer 55 and sends a stop transmitting signal to microcomputer 40. The state of the keyboard display and display section 32 remain fixed in the states they were in at the time the PAUSE pushbutton was pressed. To resume the flow of keyboard control data, the user again presses the PAUSE pushbutton.

The user may also select the toggle-type REVIEW pushbutton to review a small portion of music for concentrated practice in the case of a student, or for detailed analysis or examination in the case of a composer or an arranger. When the REVIEW pushbutton is selected, microprocessor system 42 sends a stop transmitting signal to microcomputer 40 to tell it to stop sending data to buffer 55. Microprocessor system 40 then successively and sequentially reads a predetermined portion, say ten seconds, of the contents of buffer 55 at the rate set on SPEED dial 33. When the REVIEW pushbutton is deselected by pressing it again, transmission of input data from microcomputer 40 to buffer 55 resumes.

Microcomputer 40 may play music, instructions, or other sounds over its speakers while transmitting the input data to buffer 55. The sounds played over the speaker of the microcomputer 40 may be music corresponding to and synchronized with the keyboard display. It is further contemplated that microcomputer 40 may also transmit data for tone generators 49 along with the keyboard control data. As such, the user may use speaker 48 in keyboard assembly 20 to play music generated at the microcomputer 40.

Various modifications are contemplated and may obviously be resorted to by those skilled in the art without departing from the spirit and scope of the invention. It is therefore to be understood, that within the scope of the appended claims, the invention may be practiced otherwise than as specifically described.

What is claimed is:

1. A musical instrument system comprising:
   a musical keyboard composed of a plurality of keys, each of said keys having a playing surface;
   a keyboard display means mounted on said keyboard adjacent said keys for selectively altering the appearance of said playing surface of different ones of said keys to visually inform a player that said keys having said altered appearance are to be played by said player, and wherein said altered appearance identifies which ones of said player's fingers and hands are to be used for playing the corresponding ones of said keys; and
   a control circuit means connected to said keyboard display means for receiving input signals and for controlling said keyboard display means in response to said input signals.

2. The system of claim 1 wherein said keyboard display means includes a plurality of finger indicators, each of said finger indicators being located adjacent said playing surface of a different one of said keys and having indicia means for selectively changing the appearance of said key by displaying indicia adjacent said playing surface of said adjacent one of said keys to inform said player which of said player's fingers are to be used for playing said adjacent one of said keys.

3. A musical instrument system comprising:

a musical keyboard composed of a plurality of keys;

a keyboard display means mounted on said keyboard adjacent said keys for selectively identifying which of said keys are to be played by a player and which of the player's fingers are to be used for playing said keys, said keyboard display means including a plurality of finger indicators, each of said finger indicators being located adjacent a different one of said keys and having indicia means for indicating which of said player's fingers are to be used for playing the adjacent one of said keys, each said indicia means embedded in the surface of a different one of said keys, said keyboard display means further including a plurality of hand indicator means, each said hand indicator means located adjacent a different one of said keys for indicating which of said player's hands are to be used for playing the adjacent one of said keys; and a control circuit means connected to said keyboard display means for receiving input signals and for controlling said keyboard display means in response to said input signals, and said control circuit means connected to said indicia means for selectively energizing said indicia means in response to said input signals.

4. The system of claim 3 wherein each of said hand indicator means includes a three-state means having an off state, a first on state, and a second on state for indicating that the adjacent key is not to be played, is to be played with the left hand, or is to be played with the right hand, respectively.

5. The system of claim 4 wherein said keys are partially transparent, said three-state means includes a two-color illumination means for directing different colored light through said adjacent key so as to have a first-color appearance when said three-state means is in its first on state, or to have a second-color appearance when said three-state means is in its second on state, or to not illuminate said adjacent key when said three-state means is in its off state, and wherein said control circuit means connects to said two-color illumination means for selectively energizing said two-color illumination means in response to said input signals.

6. A musical instrument system comprising:

a musical keyboard composed of a set of playing keys:

plural finger indicators, each of said finger indicators being located on the surface of a different one of said playing keys and having indicia means for indicating on said surfaces which of said player's fingers are to be used for playing said playing key on which said finger indicator is mounted;

plural hand indicators, each of said hand indicators being located adjacent a different one of said playing keys and having illumination means for selectively changing the appearance of the surface of the adjacent one of said playing keys for indicating which of said player's hands are to be used for playing said adjacent one of said playing keys; and a control circuit means connected to said indicia means and said illumination means for receiving input signals and for selectively energizing said indicia means and said illumination means in response to said input signals.

7. The system of claim 6 further including a tone select means for permitting said player to selectively choose a tone from a menu of tones to generate a corresponding set of said input signals for controlling said indicia means and said illumination means via said control circuit means.

8. The system of claim 6 further including a data input system and an input select means for permitting said player to selectively input a prerecorded set of said input signals from said data input system for controlling said indicia means and said illumination means via said control circuit means.

9. The system of claim 8 wherein said data input system includes a computer system having storage means for storing prerecorded audio signals and a corresponding set of said input signals, and an audio playing means for playing said audio signals while said control circuit means controls said indicia means and said illumination means in response to said corresponding set of said input signals.

10. The system of claim 9 wherein said input select means includes speed adjust means for varying the speed that said control circuit means controls said indicia means and said illumination means in response to said input signals.

11. The system of claim 9 wherein said input select means includes review means for causing said control circuit means to control said indicia means and said illumination means with repetitions of a predetermined portion of said input signals.

12. The system of claim 11 wherein said input select means includes pause means for causing said control circuit means to stop control of said indicia means and said illumination means with said input signals.

13. A musical instrument system comprising:

a musical keyboard composed of a set of playing keys;

plural finger indicators, each of said finger indicators being located adjacent a different one of said playing keys and having indicia means for indicating which of said player's fingers are to be used for playing the adjacent one of said playing keys;

plural hand indicators, each of said hand indicators being located adjacent a different one of said playing keys and having illumination means for indicating which of said player's hands are to be used for playing the adjacent one of said playing keys;

a control circuit means connected to said indicia means and said illumination means for receiving input signals and for selectively energizing said indicia means and said illumination means in response to said input signals;

a data input system including a computer system having storage means for storing prerecorded audio signals and a corresponding set of said input signals;

an input select means for permitting said player to selectively input a prerecorded set of said input signals from said data input system for controlling said indicia means and said illumination means via said control circuit means, said input select means including review means for causing said control circuit means to control said indicia means and said illumination means with repetitions of a predetermined portion of said input signals, said input select means further including pause means for causing said control circuit means to stop control of said indicia means and said illumination means with said input signals;

an audio playing means for playing said audio signals while said control circuit means controls said indicia means and said illumination means in response to said corresponding set of said input signals; and a notes display means mounted adjacent said musical keyboard for displaying an identification of the tones corresponding to the energized ones of said indicia means and said illumination means.

14. A musical instrument system comprising:

a musical keyboard composed of a set of partially transparent playing keys;

plural indicia means each embedded in the upper surface of a different one of said playing keys for indicating which of said player's fingers are to be used for playing said playing key in which it is embedded;

plural two-color illumination means mounted adjacent to and below the lower surface of a different one of said playing keys for directing different colored light through said adjacent key for indicating which of said player's hands are to be used for playing the adjacent one of said keys; and a control circuit means connected to said indicia means and said two-color illumination means for receiving input signals and for selectively energizing said indicia means and said two-color illumination means in response to said input signals.

15. The system of claim 14 further including a computer system having storage means for storing prerecorded audio signals and a corresponding set of said input signals, and an audio playing means for playing said audio signals while said control circuit means controls said indicia means and said two-color illumination means in response to said corresponding set of said input signals.

16. A method of operating a musical keyboard instrument having a plurality of keys comprising:

causing the appearance of a first set of said keys to change to a first appearance and a second set of said keys to change to a second appearance, different from said first appearance, to indicate to a player that one of said player's hands should be used for playing said first set of said keys and that the other of said player's hands should be used for playing said second set of said keys;

displaying indicia adjacent said first and second sets of said keys to indicate to said player the fingers of said hands to be used for playing said first and second sets of said keys; and selectively changing said appearance of said keys and said indicia on said keys in accordance with a predetermined pattern.

17. The method of claim 16 wherein said step of causing the appearance of said keys to change includes the step of selectively illuminating said keys to change the key appearance.

18. A method of operating a musical keyboard instrument having a plurality of keys comprising:

causing the appearance of said keys to change to indicate to a player the hand to be used for playing said keys, wherein said keys are selectively illuminated with two different colors to indicate which of the two player's hands is to be used for playing said keys;

displaying indicia on said keys to indicate to a player the fingers of said hands to be used for playing said keys; and selectively changing said appearance of said keys and said indicia on said keys in accordance with a predetermined pattern.

19. The method of claim 18 wherein said displaying indicia on said keys includes displaying on the surface of said keys a finger identifying symbol from a set of symbols.

* * * * *